United States Patent [19]
Benton et al.

[11] Patent Number: 5,492,030
[45] Date of Patent: Feb. 20, 1996

[54] METHODS OF MAKING BALL NUTS FOR PRELOADED BALL NUT AND SCREW ASSEMBLIES

[75] Inventors: Robert L. Benton, Bay City; William E. Welling, Saginaw, both of Mich.

[73] Assignee: Thomson Saginaw Ball Screw Company, Inc., Saginaw, Mich.

[21] Appl. No.: 186,976

[22] Filed: Jan. 26, 1994

[51] Int. Cl.$^6$ .................................................. F16H 25/22
[52] U.S. Cl. ........................................... 74/441; 74/459
[58] Field of Search ...................................... 74/441, 459

[56] References Cited

U.S. PATENT DOCUMENTS

| | | |
|---|---|---|
| 269,790 | 12/1882 | Johnston . |
| 460,312 | 9/1891 | Schweizer . |
| 990,687 | 4/1911 | Vanstone . |
| 1,402,508 | 1/1922 | Lothrop . |
| 1,466,953 | 9/1923 | Loomis . |
| 2,058,841 | 10/1936 | Thomson . |
| 3,195,220 | 7/1965 | Martin . |
| 3,638,507 | 2/1972 | Orner ............................... 74/441 X |
| 3,720,116 | 3/1973 | Better et al. . |
| 3,722,312 | 3/1973 | Better et al. . |
| 3,930,294 | 1/1976 | Kalen . |
| 4,133,089 | 1/1979 | Heymanns . |
| 4,369,643 | 1/1983 | Cianciolo et al. . |
| 4,536,931 | 8/1985 | Roper . |
| 4,811,976 | 3/1989 | Yagisawa . |
| 4,821,388 | 4/1989 | Okumura et al. . |
| 4,924,568 | 5/1990 | Sato et al. . |
| 5,263,381 | 11/1993 | Shiri . |

FOREIGN PATENT DOCUMENTS 2253675 9/1992 United Kingdom ..................... 74/441

Primary Examiner—Charles A. Marmor
Assistant Examiner—Mary Ann Battista
Attorney, Agent, or Firm—Learman & McCulloch

[57] ABSTRACT

A method of making ball screw and nut assemblies, and the products which result, wherein the nut is provided with a deformable wall portion of decreased compressive strength interjacent the ends of the nut. A compressive force is applied to the nut to axially deform the portion of decreased compressive strength while not changing the lead of adjacent lands and grooves in the non-compressed portion of the nut. The axial position of the lands and grooves in the non-compressed portion is thereby axially displaced such as to preload a recirculating train of balls traveling along the non-compressed portion of the nut relative to the lands and grooves of the screw, when the screw, nut, and balls are assembled.

10 Claims, 3 Drawing Sheets

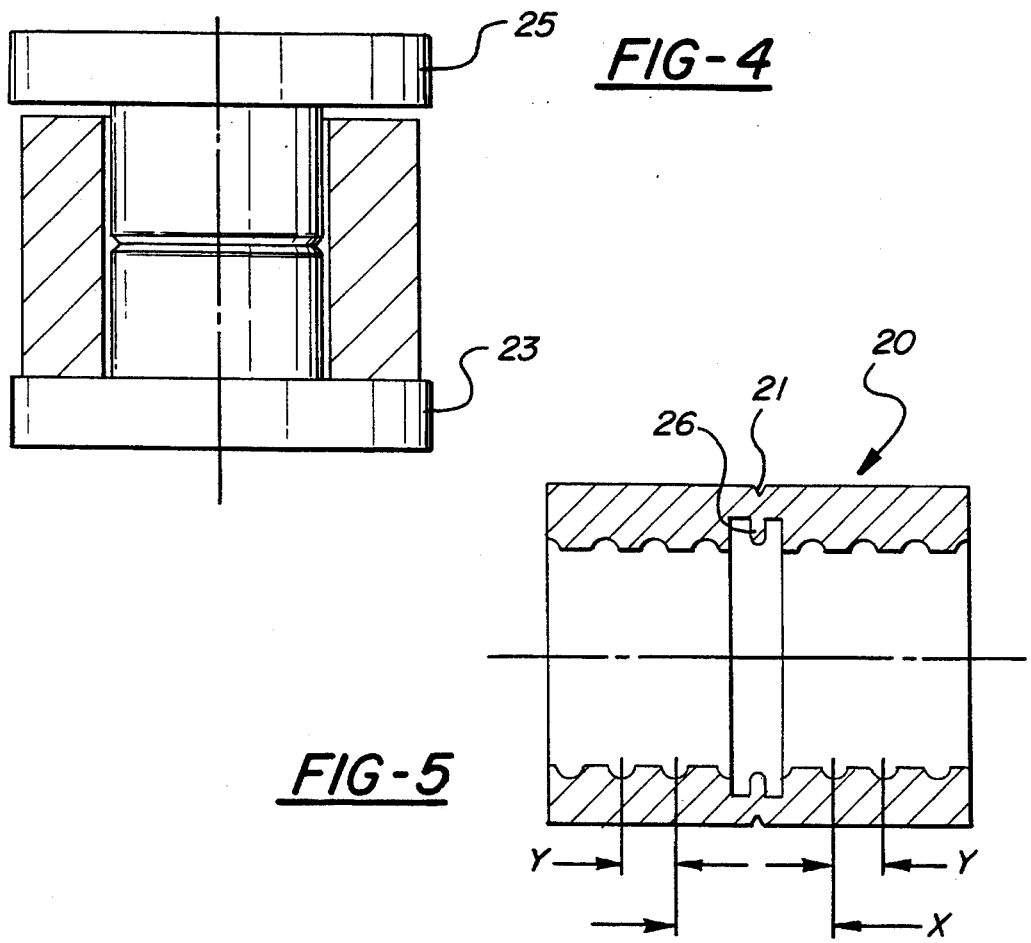
FIG-4
FIG-5
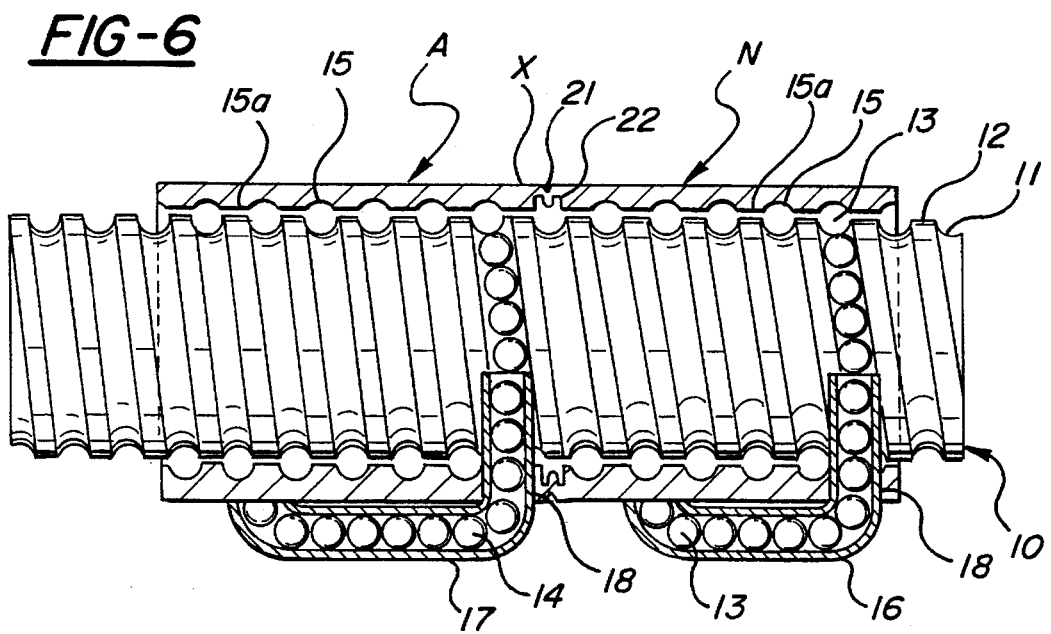
FIG-6

METHODS OF MAKING BALL NUTS FOR PRELOADED BALL NUT AND SCREW ASSEMBLIES

BACKGROUND OF THE INVENTION

The present invention relates to methods of making recirculating ball nut and screw assemblies which are internally preloaded to reduce lash. Preloading of the load bearing components or balls of ball nut and screw actuators is common in the production of ball nut and screw assemblies to achieve quality results without the necessity to hold undue tolerances, and to provide the consistency which is necessary to the use of the assemblies, particularly, for example, those which may be used on machine tools which perform close tolerance machining.

One method of fabricating preloaded ball nut and screw assemblies is disclosed in the present assignee's U.S. Pat. No. 4,643,041, issued Feb. 17, 1987, and involves utilizing a hardenable preloading plastic ring between a pair of nut members which exerts a preload once the ring, which is an epoxy ring, hardens.

Other patents, and I refer particularly to U.S. Pat. No. 3,479,897 granted Nov. 25, 1969, utilize springs, such as torsion springs, between two nuts which are provided in tandem relation on ball screws, and particularly, rolled screws which provide less precision than ground screws. Such preloaded ball screw and nut assemblies maintain the preload control necessary during the useful life of the system, despite wear, to achieve increased operating life.

SUMMARY OF THE INVENTION

The present invention, in one of its aspects, is directed to a new method of forming recirculating ball nut and screw systems wherein a section of the nut interjacent its ends is structurally weakened, as by forming an annular cut or groove in its peripheral surfaces, and an internal thread is machined in the other portions of the nut. The nut is then axially compressed, with the result that the weakened portion compresses slightly, while portions adjacent to the compressed portion remain uncompressed and provide thread portions adjacent to the compressed portion which have the same lead as the screw threads, but are displaced axially due to the compression of the weakened portion, such that, when the nut is assembled on a screw, a preload will be applied to separate ball trains in axially opposite directions.

One method of internally preloading ball nuts in common use in industry today is to form the ball thread groove in a tapping operation, and then to grind the thread surface produced such as to provide the preload configuration. This method of producing preloaded systems requires many grinding passes back and forth with the result that the method is relatively slow and somewhat labor intensive, and, accordingly, is relatively costly.

The present method employs the rough and finish tapping operations before the grinding step, but, instead of grinding, uses a burnishing tool to provide a rolled nut groove in a much less time consuming manner, while still, in the end, obtaining substantially the quality of a ball nut and screw actuator in which the preload is accomplished by grinding. The result is achieved without necessitating the use of a spring, or the imposition of an epoxy preload ring or other element.

One of the prime objects of the present invention is to design a relatively simple and very economical method of providing preloaded systems by, in effect, re-configuring the pre-threaded nut, in a manner which can be readily accomplished in high production manufacturing operations.

A further object of the invention is to provide a precision preloaded ball nut and screw assembly which achieves the preload of ground surfaces without the necessity for the grinding operation.

Still another object of the invention is to achieve the result by the simple step of fashioning the nut to produce the preload, without requiring any changes in the standard screw shaft or the recirculating load bearing balls.

A still further object of the invention is to provide a preloaded ball nut and screw shaft assembly of the character described which is durable, reliable, and has the same operating life as present, more expensive systems wherein the preload is ground in the nut.

Other objects and advantages of the invention will become apparent with reference to the accompanying drawings and the accompanying descriptive matter.

GENERAL DESCRIPTION OF THE DRAWINGS

In the drawings, FIG. 1 is a sectional elevational view of a nut blank which has been formed with a compressible section;

FIG. 4 is a view similar to FIG. 3, with a top die shown in position to axially compress the nut blank;

FIG. 5 is a sectional elevational view showing the nut blank compressed in a manner to axially relocate the land and groove portions of the nut without disturbing their lead;

FIG. 6 is an enlarged, sectional, schematic elevational view showing a nut assembled in a ball nut and screw assembly, the ball return conduits being shown schematically as external ball return tubes;

DESCRIPTION OF THE PREFERRED EMBODIMENTS

Figure 1:
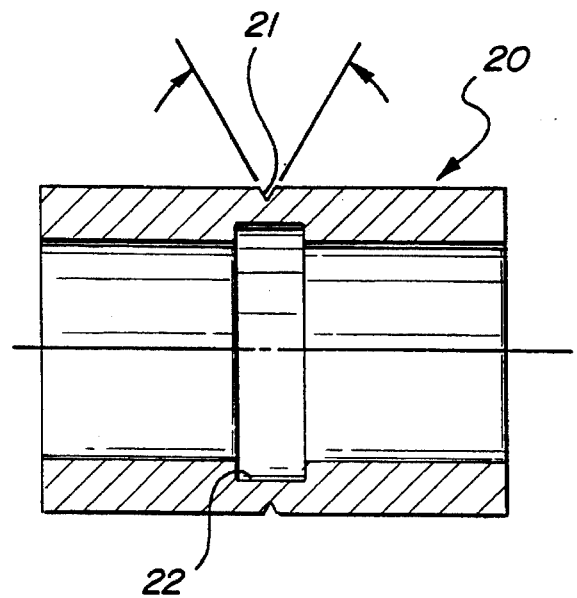

Referring now more particularly to FIG. 6 in the first instance, a ball nut and screw actuator, generally designated A, is employed to generally identify the assembly which, as usual, comprises a ball screw component 10 having a helical ball groove 11 and a helical land 12. The groove 11 is well suited to accommodating separate trains of load bearing balls 13 and 14 which are accommodated in a like groove 15 provided in the nut, which we have generally designated N. As is usual, the nut helical groove 15 and screw groove 11 are complemental in the sense that they are identically configured and have the same lead.

Provided in the usual manner, to receive the balls 13 and 14 at one end and return them at the other are external ball return tubes 16 and 17, respectively. The ball return tubes, which are U-shaped in configuration, have ends which lead into passage portions 18 provided in the peripheral wall of the nut N as shown, and a pair of passage portions 18 are necessary to accommodate each ball return tube 16 or 17, as usual. The tubes 16 and 17 extend through the annular wall of the nut to communicate with the nut groove 15 and deflect balls into the tubes 16 and 17 in the usual manner when the nut and screw are relatively moved. The nut is configured to preload the balls 13 and 14, when the nut is assembled in position, in a novel and improved manner which will now be described.

Figure 2:
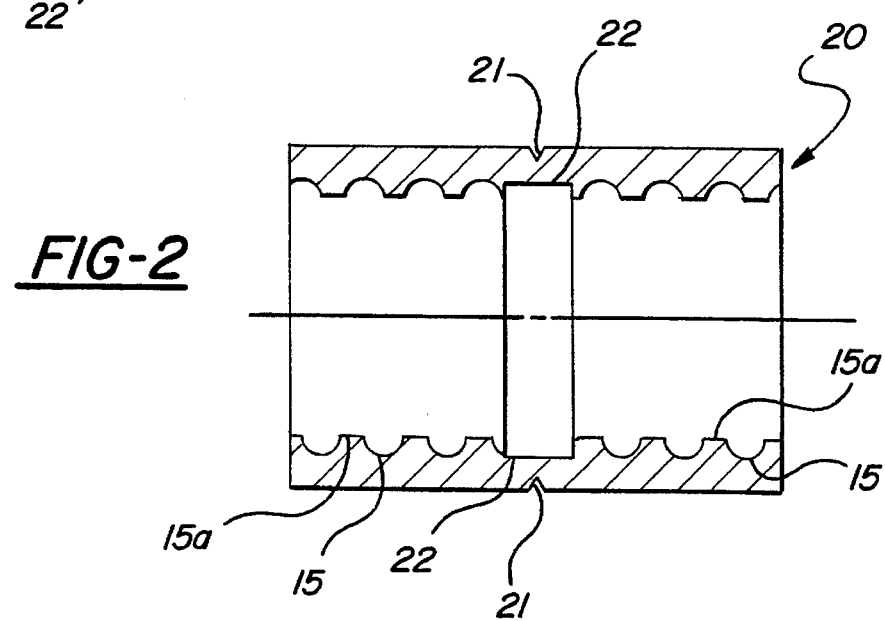
FIG. 2 is a similar view showing threads formed in the nut blank of FIG. 1.

With reference now particularly to FIG. 1, it will be noted that a metallic sleeve blank, generally designated 20, is provided with an annular groove, slit or notch 21 in its outer wall, opposite an annular interior groove 22. The nut blank 20 may be constructed of steel of the same character presently employed in ball nuts, or of another suitable material. A typical material is SAE 8620 steel. The next step in forming the nut is to internally groove the interior bore of the blank 20 in a manner to provide the usual helical groove 15 having groove portions and defining land portions 15a (FIG. 2). The land portions 15a the groove portions 15 are formed with the same lead as the screw groove 11 and screw land 12. The internal threading of the blank 20 is accomplished via the usual tapping operation followed by a burnishing operation. The grooves 15 are first rough cut with a rough tapping tool and, then, finish cut with a finish tapping tool. After this, a burnishing tool is used to roll the groove surface and displace metal to provide the rolled groove 15. It is to be understood that a groove formed by tapping and burnishing is not a novel step, except in combination with the weakening of the wall of the blank 20 which has been described, and the subsequent compression operation.

Figure 3:
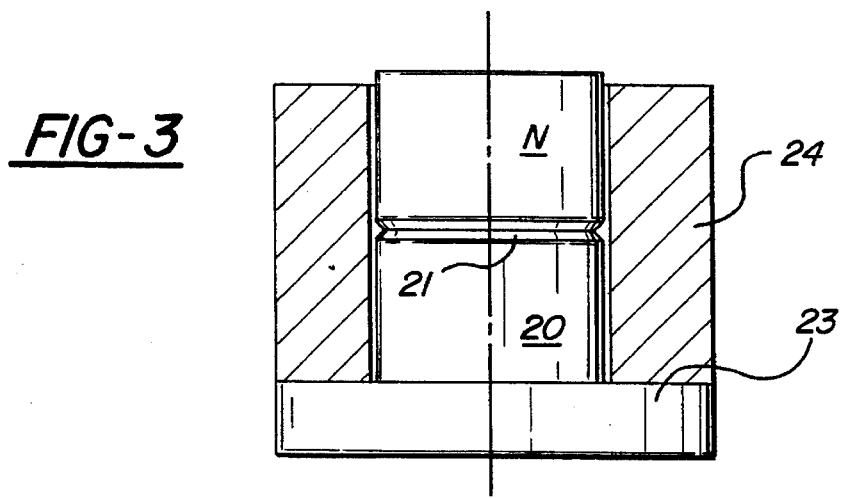
FIG. 3 is a schematic sectional elevational view showing the nut blank of FIG. 2 received within a die ring.

In FIG. 3, it will be observed that the nut blank 20 has been inverted and placed on a fixed lower die member 23, with its girth annularly restrained by the annular die ring 24. The upper end of the inverted blank 20 is then engaged by an upper die member 25, as shown in FIG. 4. The lowering of the die 25 relative to the die 23, in a conventional press, then provides a deformed compression section generally designated "x" between end sections which are not compressed.

FIG. 5 well demonstrates the compressed condition of the nut blank 20 and illustrates the narrowing of groove 21 and the annular bead of compressed material 26 which is formed during the compressing operation. With some expected inconsequential spring-back of the material, the nut blank 20 is axially compressed, under much, much higher axial loads than would ever be encountered in the use of the device, sufficiently to provide the desired compression. It is not to be understood that the deformed section "x" will have any axial resiliency. Rather, it is an axially fixed, non-resilient mass which maintains its deformed shape to provide the operation desired regardless of the maximum operating loads applied when the nut N and ball screw 10 are assembled and used. The grooves 21 and 22 are configured and sized to achieve this axial rigidity and maintain the pre-loads achieved.

Figure 7:
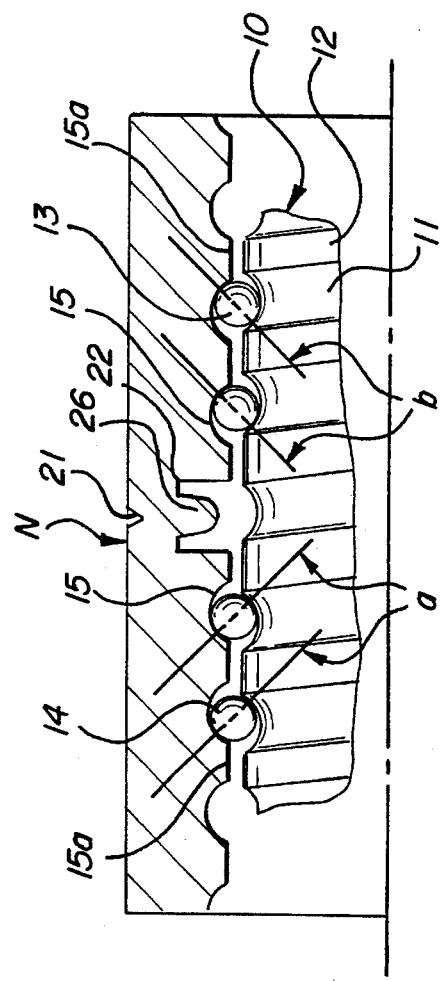
FIG. 7 is a schematic sectional, fragmentary elevational view on an enlarged scale, which is exaggerated to demonstrate the preload which is achieved.

The axially deformed portion "x" of the nut, after compression, will have groove and land portions with a true lead amount minus the amount of compression, while the groove and land portions on each side of the compressed portion "x" will have the same original or true lead. For instance, portions "y" in FIG. 5 on opposite sides of the deformed section "x" have the same lead as originally, but they are displaced slightly axially closer together, and it is this displacement which provides the preload when the nut formed is in assembled position in a ball nut and screw actuator. The preload is exerted in opposed directions on opposite sides of the compressed section "x" of the nut and balls 13 traveling in tube 16 will be preloaded in an opposite direction from the balls 14 traveling in tube 17. The manner of imparting the preload is well demonstrated in FIG. 7 in an exaggerated illustration, with the chain lines "a" and "b" indicating the contact points of the balls and the direction of preload.

THE OPERATION

The preloaded ball nut and screw assembly illustrated operates in the usual manner for translating linear motion into rotary motion, or rotary motion into linear motion. With the nut prevented from rotating, the rotation of the screw 10 will cause translation of the nut N or, if the nut N is prevented from moving axially, but is permitted to revolve, it will be the screw 10 which is moved axially. Because the preloading eliminates lash in either direction, the precise positioning of tools, work pieces and the like, can be reliably and efficiently accomplished with precision.

ANOTHER EMBODIMENT

Figure 8:
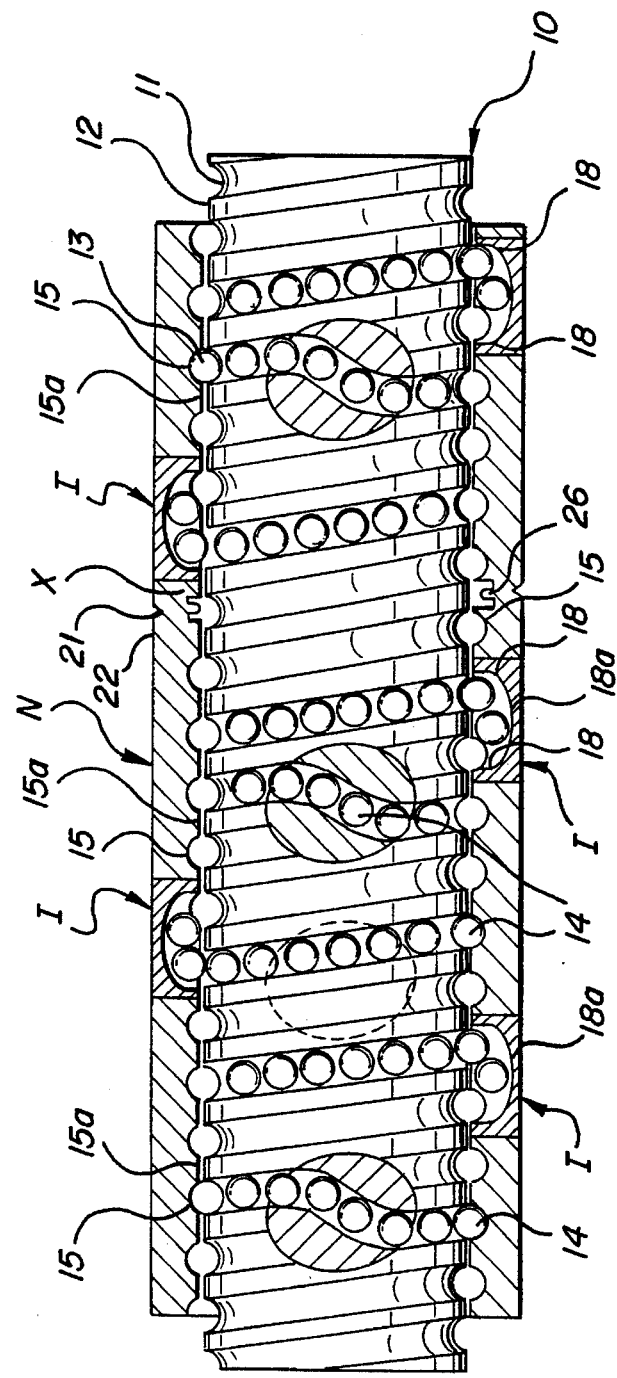
FIG. 8 is a similar schematic view wherein multiple circuits are provided on each side of the compressed section of the nut and the ball return passages are internal.

In FIG. 8, another embodiment is disclosed in which like numerals have been used to designate like parts. In this case, six circuits are provided on the left side of the compressed portion "x" of the nut, and three circuits on the other. Here, internal passage portions 18 lead through the body of the nut internally to different groove portions in the screw 10. The groove portions 18 in FIG. 8 are connected by intermediate groove portions 18a and the groove portions 18 and 18a are provided in nut wall inserts, generally designated I, in the usual manner. The six recirculating ball circuits at the left side of the compressed portion of the nut are preloaded oppositely to the three recirculating ball circuits located at the portion of the nut at the right side of the compressed portion in FIG. 8.

It is to be understood that the embodiments described are exemplary of various forms of the invention only and that the invention is defined in the appended claims which contemplate various modifications within the spirit and scope of the invention.

I claim:

1. In a method of making ball nuts for ball nut and screw assemblies comprising a steel ball nut with internal helical groove portions of a predetermined lead separated by internal helical land portions, and a screw with external helical groove portions of the same lead separated by external helical land portions, and wherein the nut has end walls and a sleeve wall which is internally threaded to provide said internal helical land portions and groove portions which are configured to be complemental with said external helical land portions and groove portions of said screw to form raceways for trains of load bearing recirculating balls which are receivable between said groove portions of the nut and the screw, the steps of:

a) providing an axially compressible portion of decreased compressive strength in said sleeve wall of said nut interjacent the end walls of the nut so as to separate non-compressible portions;

b) applying a compressive force to the end walls of the nut axially and while the nut is held circumferentially in a die ring to axially permanently deform said portion of decreased compressive strength to define an axially compressed portion of decreased axial length while not changing the lead of the groove portions in the non-compressible portions of the nut, and thereby relatively displacing the axial position of the groove portions in the non-compressible portions of the nut relative to the groove portions of said screw such as to axially oppositely preload said trains of balls traveling along said non-compressible portions; and c) providing ball return passage portions in said nut in said non-compressible portions to facilitate recirculation of said trains of balls between said groove portions of said nut and said screw.

2. The method of claim 1 wherein said groove portions in said nut are formed in a tapping operation, and then finished in a burnishing operation.

3. The method of claim 2 wherein said tapping operation is accomplished sequentially with a rough tapping tool and a finish tapping tool.

4. The method of claim 1 wherein said ball return passage portions include an axially spaced pair of adjacent passage portions provided in each of said non-compressible portions.

5. The method of claim 4 wherein said ball return passage portions in said nut lead to and from an external ball return passage section.

6. The method of claim 4 wherein said ball return passage portions in said nut are communicated with internal ball return passage sections in said nut.

7. The method of claim 4 wherein more pairs of said ball return passage portions are provided on one side of said axially compressed portion of said nut than on the other.

8. The method of claim 4 wherein the same number of spaced apart pairs of said ball return passage portions are provided on both sides of said axially compressed portion of said nut.

9. The method of claim 4 wherein said axially compressible portion is formed by an annular slit in the exterior of said sleeve wall of said nut radially opposite an annular groove provided interiorly in said sleeve wall of said nut.

10. In a method of making ball nut and screw assemblies comprising a steel ball nut with internal helical groove portions of a predetermined lead separated by land portions and a screw with exterior groove portions of the same lead separated by land portions, the nut having end walls and a sleeve wall in which said groove portions in said nut are formed complementarily with the groove portions in said screw to form a raceway between said groove portions of the nut and the screw for trains of load bearing recirculating balls, the steps of:

a) providing said screw;

b) internally annularly grooving the interior of said sleeve wall interjacent the end walls of the nut and providing an axially deformable portion of decreased compressive strength in said sleeve wall of said nut and defining an axially compressible portion separating non-compressible portions in said sleeve wall;

c) helically rough tapping said sleeve wall of said nut on opposite sides of said axially compressible portion to form said helical groove portions with said predetermined lead in said sleeve wall of the nut;

d) finish tapping said groove portions of the nut formed in step b);

e) burnishing said groove portions of the nut formed in step c) to finish machine them;

f) inserting said nut in a die ring held in a die press and operating said press to apply a compressive force to squeeze the end walls of the nut axially to axially deform said axially deformable portion of decreased compressive strength and define a permanently axially compressed portion between said non-compressible portions and while not changing the lead of the groove portions in the non-compressible portions of the nut, and thereby relatively displacing the axial positions of the groove portions in the non-compressible portions of the nut relative to the groove portions of said screw such as to preload said trains of balls in axially opposite directions when the nut and the screw are assembled;

g) providing ball return passage portions in said non-compressible portions of the nut to facilitate recirculation of said trains of balls between the groove portions of said nut and said screw on opposite sides of said permanently axially compressed portion;

h) assembling said ball nut and said screw and loading said trains of balls into said groove portions of the nut and the screw.

\* \* \* \* \*